United States Patent [19]

Zarembowitch

[11] Patent Number: 5,214,669
[45] Date of Patent: May 25, 1993

[54] CODE ACQUISITION PROCESS AND CIRCUIT FOR A SPREAD-SPECTRUM SIGNAL

[75] Inventor: Alain Zarembowitch, Katwijk, Netherlands

[73] Assignee: Agence Spatiale Europeenne, Paris, France

[21] Appl. No.: 687,894

[22] PCT Filed: Oct. 10, 1990

[86] PCT No.: PCT/EP90/01666

§ 371 Date: Jul. 29, 1991

§ 102(e) Date: Jul. 29, 1991

[87] PCT Pub. No.: WO91/06155

PCT Pub. Date: May 2, 1991

[30] Foreign Application Priority Data

Oct. 12, 1989 [FR] France ................... 89 13360

[51] Int. Cl.$^5$ ........................................... H04L 7/00
[52] U.S. Cl. ................................................... 375/1
[58] Field of Search ...................................... 375/1

[56] References Cited

U.S. PATENT DOCUMENTS

| | | | |
|---|---|---|---|
| 4,007,330 | 2/1977 | Winters | 375/84 |
| 4,203,071 | 5/1980 | Bowles et al. | 375/1 |
| 4,550,414 | 10/1985 | Guinon et al. | 375/1 |
| 4,774,715 | 9/1988 | Messenger | 375/1 |
| 5,022,047 | 6/1991 | Dixon et al. | 375/1 |

FOREIGN PATENT DOCUMENTS 59-45739  3/1984  Japan .

OTHER PUBLICATIONS

Proceedings of Melecon '87 Mediterranean Electrotechnical Conference, Mar. 24-26, 1987, Rome, Italy, M. K. Sust et al. entitled "All Digital Signal Processing in a Spread Spectrum Communication System", pp. 157-161.

*Primary Examiner*—Gilberto Barrón, Jr.
*Attorney, Agent, or Firm*—Kramer, Brufsky & Cifelli

[57] ABSTRACT

The spread-spectrum signal (S1) is converted into a one-bit quantized binary signal (S2) and this signal is coupled to a plurality of parallel detection circuits (10), each of said detection circuits being adapted to detect a distinct code epoch. Each detection circuit (10) receives concurrently a shifted version of a binary reference code (CR) and produces a signal (B3) having a first binary state when the received signal corresponds to the code epoch of the detection circuit and having a second binary state should it be otherwise. The output signals (B3) are combined and/or encoded to identify the correct code epoch in order to demodulate the received signal. The invention is used in communication systems receivers.

2 Claims, 2 Drawing Sheets

CODE ACQUISITION PROCESS AND CIRCUIT FOR A SPREAD-SPECTRUM SIGNAL

The present invention relates to a code acquisition process and circuit for a spread-spectrum signal receiver, i.e. a receiver for demodulating a signal generated by modulation of an electrical signal with a noisy binary code.

A binary code modulated signal is used for example in radio-communication systems and in pulse-compression radar systems. A receiver adapted for receiving and demodulating a binary code PSK (Phase-Shift-Keying modulation) modulated signal must include a circuit organised to perform an initial search for the single correct epoch of the received code among a wide range of possible epochs, with the code binary sequence being assumed to be known a priori. The search process is referred to as "code acquisition" and the circuit provided for carrying out the search is referred to as code acquisition circuit.

Most of the known code acquisition circuits are based on the implementation of a signal processing method comprising a correlation process (despreading) followed by a quadratic detection process. After amplification and down-conversion into the appropriate frequency band (intermediate frequency or baseband), the received signal is mixed with a reference code set at a given code epoch, then the mixed signal is filtered and squared, and thereafter it is passed through an integrate circuit. The output from the integrator is compared with a threshold and the integrated signal level crossing said threshold level indicates in all likelihood that the received signal is a spread-spectrum signal and that the code epoch thereof matches the epoch of the reference code.

If the epoch of the reference code matches the epoch of the received noisy signal, then the signal at the mixer output is a narrow-band carrier. As to the wideband noise, it is further spread by mixing with the reference code and the narrow-band filter following the mixer rejects the wideband noise and thus improves the carrier-to-noise ratio.

However, if the epoch of the reference code does not match the epoch of the received noisy signal, then both carrier and noise at the mixer output are wide-band signals and the narrow-band filter rejects them both. The carrier-to-noise ratio then remains unchanged.

The bandwidth of the narrow-band filter determines the carrier receiving band. It must be large enough to accommodate a narrow-band carrier affected by link Doppler and by frequency uncertainty pertaining to the local oscillators. Conversely, the filter bandwidth must be small enough as to reject most of the wideband noise and the spread carrier when the epoch of the reference code is not correct.

A quadratic detection process follows the correlation process described hereabove, whereby the former aims at detecting the presence of a carrier in additive white gaussian noise. The integration time and the threshold are set to detect a despread carrier (equivalent case to a correct code epoch) and to not detect a spread carrier (equivalent case to an incorrect code epoch), both with a high degree of confidence. Typically, the desired probability of detection is greater than 0.9 and the desired probability of false acquisition per trial is less than 0.001.

To obtain a fast rejection of the wrong code epochs, the output from the integrator may be evaluated during the integration, instead of at the end of the operation as previously described. This modified process, called sequential acquisition, reduces the acquisition time by a factor of approximately two to three.

In known acquisition circuits, the correlation process is performed on analog signals and the filtering is thus carried out by means of an analog filter. Subsequently, the despread signal is sampled and quantized by means of a multi-bit analog-to-digital converter. The subsequent processing is performed digitally.

This known process has the following drawbacks:

a) performing partly analogical processing results in a lack of flexibility, complex non-reproductible construction and, in certain applications, the need for circuit tuning;

b) need for using at least one complex and costly analog-to-digital converter.

c) the hardware implementation of the faster sequential acquisition process often leads to the utilisation of microprogrammed digital processors for processing the signal, which processors involve complex circuitries operating at near full capacity.

As a result of these drawbacks, parallel processing which could otherwise provide an increase in the acquisition speed, generally cannot be implemented for the reason that in this case such a parallel processing would then involve much too much complex circuitries.

The aim of the present invention is to overcome these drawbacks by solving the problem consisting in increasing the acquisition speed of a code while keeping the complexity of the acquisition circuitry at a minimum.

To solve this problem, the invention provides a code acquisition system which implements a digital acquisition process allowing fast parallel processing to be performed and an acquisition circuit which is simple to construct.

According to an aspect of the invention there is provided a code acquisition process for demodulating a spread-spectrum signal generated by the modulation of an electrical signal with a binary code, wherein the spread-spectrum signal is converted into a binary signal, a plurality of binary detection circuits are connected in parallel, each of them being adapted to detect a different code epoch, the binary detection circuits are connected for receiving the binary signal, a different time shifted version of a binary reference code is applied simultaneously to each detection circuit, whereby each detection circuit generates a signal having a first binary state when the received signal corresponds to the code epoch of the detection circuit and a second binary state should it be otherwise, and all the output signals from the detection circuits are used for identifying the correct code epoch thereby to demodulate the received signal.

It is a further object of the invertion to provide a code acquisition circuit for a spread-spectrum signal receiver generated by the modulation of an electrical signal with a binary code, comprising a zero-crossing detector for converting the spread-spectrum signal into a one bit binary signal, a plurality of binary detection circuits having their first inputs connected in parallel for receiving the binary signal, each detection circuit being adapted to detect a different code epoch, and generating a binary detection signal having a first binary state when the signal received within a predetermined time period corresponds to the code epoch of the detection circuit and having a second binary state should it be otherwise, a shift register advancing in response to clock pulses, said shift register having the output of a different stage connected to a second input of a different detection circuit, said shift register having its input connected to receive a binary reference code whereby each stage output of the register provides a time shifted version of the binary reference code, and output means for combining and/or encoding the detection signals from all the detection circuits thereby to identify the correct code epoch of the received spread-spectrum signal.

Output means combine and/or encode the detection signals from all the detection circuits so as to identify the correct code epoch of the received signal with a view to perform demodulation.

A preferred embodiment of the detection circuits comprises an exclusive OR circuit having an input for receiving the binary input signal and an input for receiving the binary reference code in a time shifted version and having an output for generating a despread binary signal, first means for accumulating binary signals each time the signal is in the logic state 1 during a predetermined first integration period so as to generate a first accumulated signal, means for comparing the value of the first accumulated signal to two predetermined threshold levels and for generating a second binary signal having a logic state 1 when said first accumulated signal is comprised between the two threshold levels, means for accumulating binary signals each time said second binary signal is a logic state 1 during a second predetermined integration period so as to generate a second accumulated signal, and comparator means connected to the output of the first accumulating means in order to generate a binary detection signal when the second accumulated signal exceeds a third predetermined threshold level.

The advantages of the invention are that the acquisition time is substantially smaller than the one which can be obtained with the known acquisition circuits and that the invention makes it possible to perform the circuitry as an integrated circuit.

The invention is described in more detail hereafter with reference to the accompanying drawings which show an exemplary embodiment.

Figure 1:
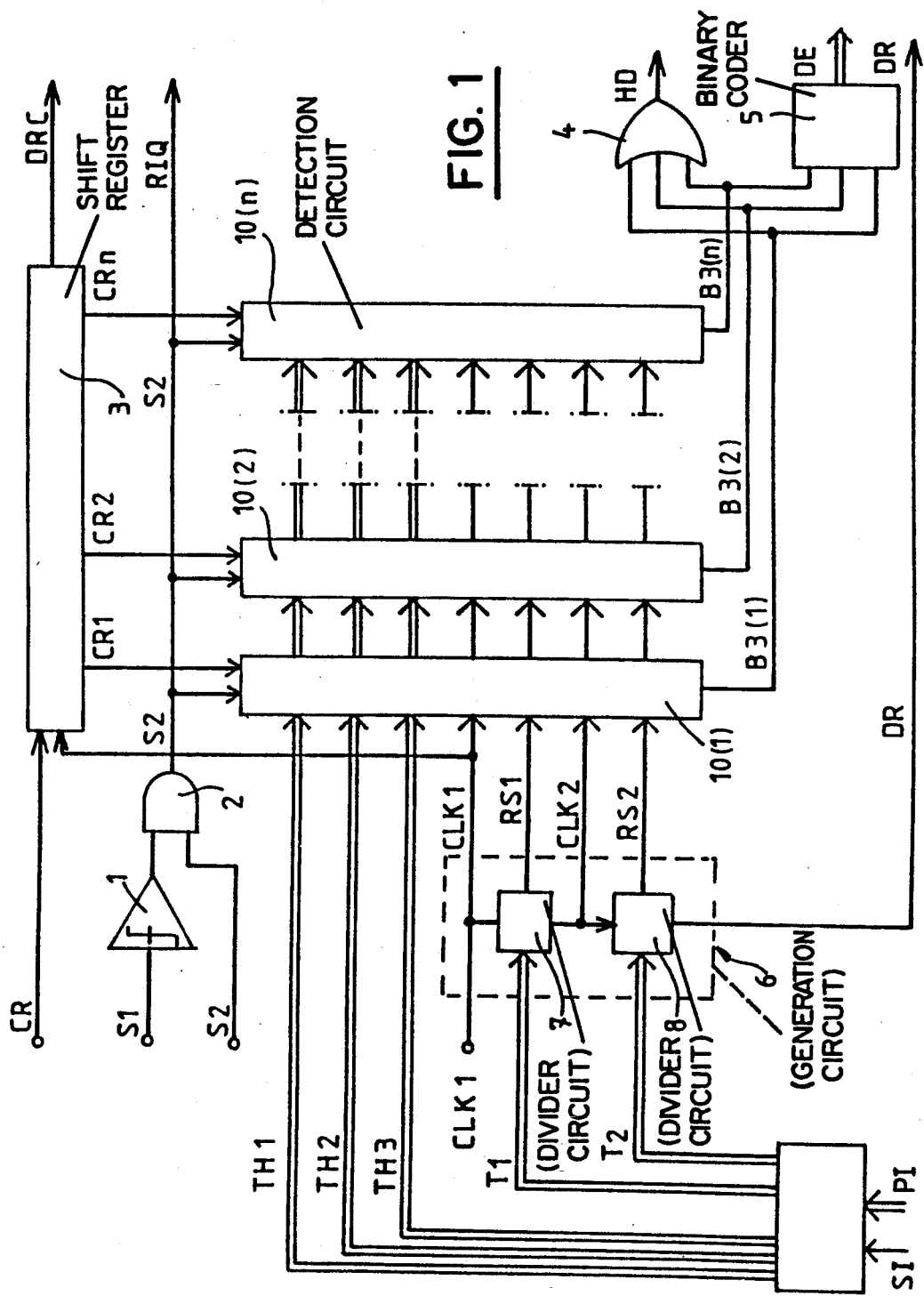
FIG. 1 is a general scheme of an acquisition circuit according to the invention.

An acquisition circuit according to the invention is shown in FIG. 1. The spread-spectrum input signal S1 is received in a zero-crossing detector 1 which continuously converts an analog input signal into a one-bit digital signal S2:a positive signal is converted into a logical 1 signal and a negative signal into a logical 0 signal. The binary signal S2 is coupled to a plurality of digital detection circuits 10. The AND-gate 2 (optional) is provided in this specific embodiment in order to permit also a binary input signal S2 to be directly coupled while bypassing the detector 1 which is unnecessary in this case.

The binary signal S2 is applied to a plurality of parallel detection circuits 10, each detection circuit serving to detect a different code epoch. In addition to signal S2, each detection circuit 10 also receives a different shifted version of a binary reference code CR. These shifted reference code versions CR are generated by a shift register 3 which advances in response to clock pulses CLK1. The shifted reference code versions are designated by the reference symbols CR1, CR2 ... CRn.

Figure 2:
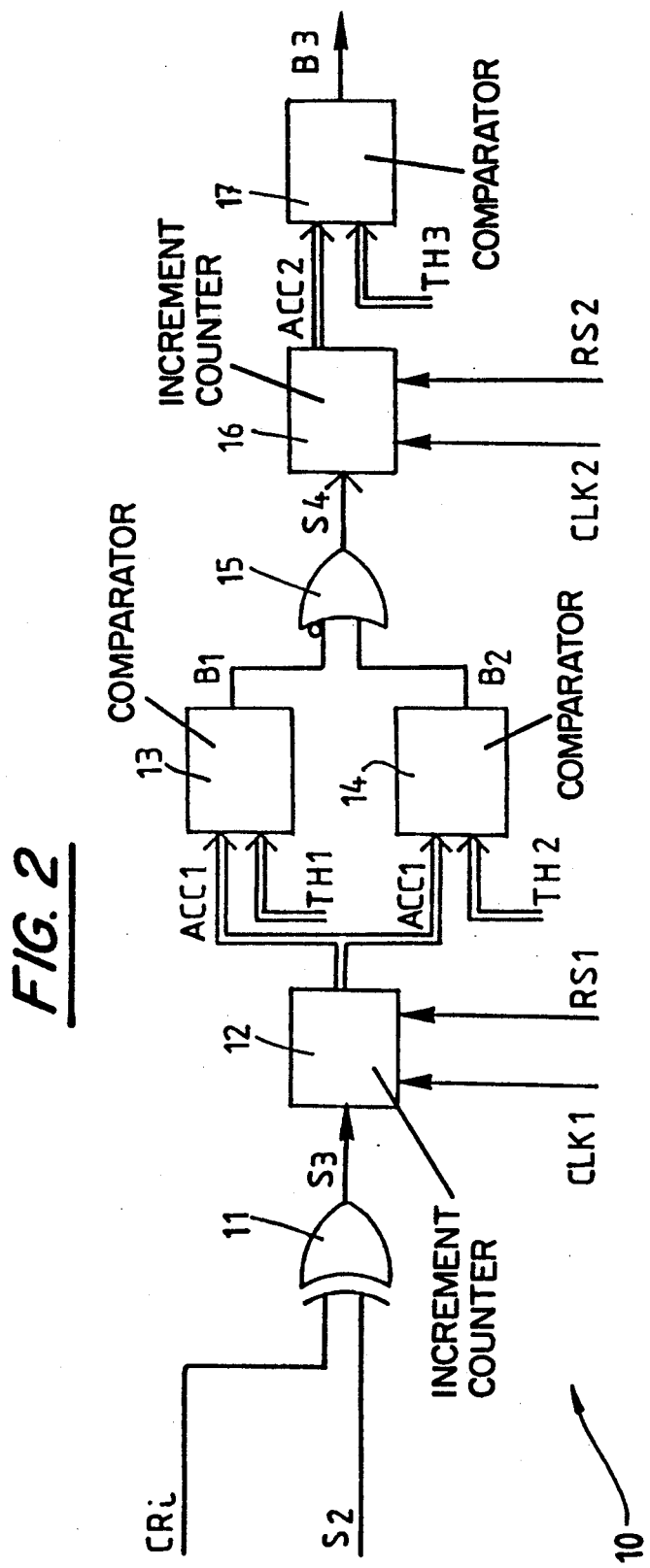
FIG. 2 is a block diagram of a specific detection circuit used in the acquisition circuit of FIG. 1.

Each detection circuit 10 is arranged as illustrated schematically in FIG. 2. The binary signal S2 is received at an input of an exclusive-OR gate 11, another input of which receives the binary reference code CR in a different time shifted version (CR1, CR2 ... CRn). The exclusive-OR gate 11 is provided for despreading the spread carrier, represented by the binary signal S2, by means of the reference code CR when the received code epoch and the reference code epoch match. The signal S3 produced at the output of the exclusive OR circuit 11 is a binary signal. When the received code epoch and the reference code epoch CRi don't match or when a noise only is present at the receiver input, signal S3 is a random one and takes value 0 or value 1 with the same likelihood. Conversely, when the received code and the reference code have the same epoch, signal S3 is substantially kept in one of the logical states (0 or 1) in accordance with the carrier phase during the integration time T1. The signal S3 is fed into an increment counter 12 incrementing in response to clock pulses CLK1. Once per CLK1 clock pulse, the counter 12 is updated, its contents is incremented by one if and only if the signal S3 is in logical state 1. The counter 12 is reset to zero at each transition of a reset signal RS1.

Shortly before reset of counter 12, the contents ACC1 of the counter (expressed by a number of bits N1) is coupled to the comparators 13 and 14 in parallel for being there compared to two threshold levels. In comparator 13, the contents ACC1 is compared to a lower threshold TH1 and in comparator 14, the contents ACC1 is compared to a higher threshold TH2. Both thresholds TH1 and TH2 are user-defined N1-bits integers. The output B1 of the comparator 13 is at logical state 1 when the contents ACC1 of counter 12 is greater than the lower threshold TH1, and at logical state 0 should it be otherwise. Similarly, output B2 of the comparator 14 is at logical state 1 when the contents ACC1 of counter 12 is greater than the higher threshold TH2 and at logical state 0 should it be otherwise. The outputs from comparators 13 and 14 are combined in a logical circuit 15 performing the logical function:

$$S4 = \overline{B1} \cdot OR \cdot B2$$

If the thresholds TH1 and TH2 are selected by the user so that TH2=T1−TH1, then the devices 13, 14 and 15 perform a function effective to remove the bias due to the noise of the variable contents ACC1, take the absolute value of the contents, and compare it with a threshold TH2−T½.

The logical state of signal S4 indicates whether the contents of counter 12 is comprised between the thresholds TH1 and TH2 or whether said contents is beyond this range of values. The signal S4 is at state 1 when the contents ACC1 is comprised between the two thresholds TH1 and TH2; the signal S4 is at state 0 when the contents ACC1 has a value beyond the range of values comprised between the two thresholds.

The binary signal S4 at the output of the logical circuit 15 is fed into a second increment counter 16 incrementing in response to clock pulses CLK2. Once per clock pulse, the contents of counter 16 is updated: it is incremented if and only if the signal S4 is a logical 1 at the occurrence of a clock signal CLK2 transition. The counter 16 resets in response to a reset signal RS2. The counter 16 is provided for filtering the absolute value of the narrow-band despread signal.

The contents ACC2 of counter 16 is compared to a threshold TH3 in the comparator 17. The comparison can be performed either continuously or at the end of the integration period defined by the reset signal RS2. Threshold TH3 is a user-defined N2-bits integer. The output B3 of comparator 17 is a logical 1 when the contents ACC2 is greater than the threshold TH3, and a logical 0 should it be otherwise. At the end of the integration period, signal B3 indicates whether the epoch of the code of the received signal matches the epoch of the reference code applied to the input of the detection circuit.

The outputs B3(1), B3(2) ... B3(n) from the detection circuits 10 are ORed in OR-gate 4. The latter generates a signal HD which is at logic state 1 if any of the detection signals B3(1), B3(2) ... 83(n) is a logical state 1, i.e. if a detection circuit 10 has detected a correct code epoch. A binary coder 5, which also receives the outputs B3(1), B3(2) ... B3(n) of the detection circuits 10, identifies the correct code epoch and generates an identification signal in a binary format designated as DE. In case a plurality of reference epochs are declared positive during the integration period T2, the signal DE designates the address of the detection circuit which has first detected a correct code epoch and consequently the corresponding code epoch. The detected code epoch is then provided for the demodulation of the signal received in the receiver.

It is clear that the acquisition circuit according to the invention makes it possible, within a given integration period T2, to acquire the code much faster than with a sequential acquisition process. With a shift register 3 having N stages, the acquisition time is N times smaller than with an acquisition circuit having one single detector. However, paralleling N detectors in the code acquisition circuit according to the invention can be practically implemented only owing to the binary detection process carried out in each detection circuit and owing to the simplicity of implementation of that detection circuit.

The clock pulses and the reset signals are generated from a master-clock providing clock pulses CLK1 having advantageously a frequency equal to the double of the code rate. The latter is preferably great with respect to the center frequency of the input signal S1 spectrum. The clock pulses CLK1 from a master-clock (not shown) are received in a generation circuit 6. The pulses CLK1 are applied directly to the clock input to the shift register 3 and to the counter 12 in each detection circuit 10. Both the periodic reset to zero signal RS1 in the first detection stage and the clock pulses CLK2 used in the second detection stage are generated by dividing the signal CLK1 frequency by an integer T1 in a divider circuit 7. The transition of signal RS1 precedes the transition of signal CLK2 by some clock pulses CLK1. The periodic reset signal RS2 in the second detection stage is generated by dividing the signal CLK2 frequency by an integer T2 in a divider circuit 8.

The detection performance (probability of detection and probability of false alarm) of an acquisition circuit as described above can be controlled by means of five programmable parameters, viz.:

T1: the integration time of counter 12 (coherent detection), expressed as an integer number of CLK1 clock pulses.

TH1: the lower threshold for the coherent detection expressed as a number of bits N1.

TH2: the upper threshold for the coherent detection expressed as a number of bits N1.

T2: the integration time of counter 16 (non-coherent detection), expressed as an integer number of CLK2 clock pulses.

TH3: the threshold for the non-coherent detection expressed as a number of bits N2.

As to the construction, the circuit has two degrees of freedom: the number of bits N1 and the number of bits N2.

At the end of each integration period T2, the generation circuit 6 generates an output signal DR indicating that the output data HD and DE are ready.

In a specific embodiment, the parameters TH1, TH2, TH3, T1 and T2 can be multiplexed so as to limit the number of circuit pins. The interface circuit 9 represented in FIG. 1 allows both the connection (PI) of a parallel microprocessor-compatible interface device and the connection (SI) of a serial interface device.

The embodiment of the invention described in the foregoing is an example given by way of illustration and the invention is in no way restricted to that example. Any modification, any variation and any equivalent arrangement must be considered as being comprised within the scope of the invention.

For example, the DRC output from the shift register 3 and the output RIQ can be used for connecting to further acquisition circuits for still increasing the possibilities of parallel processing. Further, the yet high integration degree of the acquisition circuit of the invention may be further increased by offsetting the clock pulses for each individual detector. In that case indeed, only a set of comparators 13, 14 and/or 17 can be utilized for a plurality of or all the detection circuits by means of the time-sharing access technique. This is perfectly possible since the comparators in a detection circuit are used during a period of only a few clock pulses only. Another interesting example consists in implementing the circuit with a threshold TH3 which is adjusted dynamically.

I claim:

1. A code acquisition circuit for a spread-spectrum signal receiver generated by modulation of an electrical signal with a binary code, comprising:
   a zero-crossing detector for converting the spread-spectrum signal into a one-bit binary signal,
   a plurality of binary detection circuits having their first inputs connected in parallel for receiving the one-bit binary signal, each detection circuit comprising:
      an exclusive OR gate having an input for receiving the binary input signal and an input for receiving the binary reference code in a time shifted version and having an output for generating a despread binary signal,
      first means for accumulating binary signals each time the signal has a logical state 1 during a predetermined first integration period to generate a first accumulated signal,
      means for comparing the value of the first accumulated signal to two predetermined threshold levels and for generating a second binary signal having a logical state 1 when the first accumulated signal is between the two threshold levels,
      second means for accumulating binary signals each time the second binary signal has a logical state 1 during a second predetermined integration period to generate a second accumulated signal, and comparator means connected to the output of the second means for accumulating for generating a binary detection signal when the second accumulated signal exceeds a third predetermined threshold level;

a shift register advancing in response to clock pulses, the shift register having the output of each state thereof connected to a second input of a different detection circuit, the shift register having its input connected to receive a binary reference code whereby each state output of the register provides a time shifted version of the binary reference code, and output means for combining and/or encoding the detection signals from all the detection circuits so as to identify the correct code epoch of the spread-spectrum signal.

2. An apparatus according to claim 1, wherein the means for comparing comprises comparators connected to the output of the first accumulating means to generate a first signal when the first accumulated signal exceeds a lower threshold level and to generate a second signal when the first accumulated signal exceeds an upper threshold level, and a logical circuit for combining the first and second signals and for generating the second binary signal in accordance with the logical function $S4 = \overline{B1} \cdot OR \cdot B2$.

* * * * *